(12) United States Patent
Guinane

(10) Patent No.: US 10,733,358 B2
(45) Date of Patent: Aug. 4, 2020

(54) METHOD AND SYSTEM FOR SITE MIGRATION

(71) Applicant: salesforce.com, inc., San Francisco, CA (US)

(72) Inventor: Gavin Guinane, Dublin (IE)

(73) Assignee: salesforce.com, inc., San Francisco, CA (US)

( * ) Notice: Subject to any disclaimer, the term of this patent is extended or adjusted under 35 U.S.C. 154(b) by 31 days.

(21) Appl. No.: 13/969,399

(22) Filed: Aug. 16, 2013

(65) Prior Publication Data

US 2014/0082479 A1 Mar. 20, 2014

Related U.S. Application Data

(60) Provisional application No. 61/702,051, filed on Sep. 17, 2012.

(51) Int. Cl.
| | | |
|---|---|---|
| *G06F 17/21* | (2006.01) | |
| *G06F 40/117* | (2020.01) | |
| *G06F 16/958* | (2019.01) | |
| *G06F 40/14* | (2020.01) | |
| *G06F 40/154* | (2020.01) | |

(52) U.S. Cl.
CPC .......... *G06F 40/117* (2020.01); *G06F 16/958* (2019.01); *G06F 40/14* (2020.01); *G06F 40/154* (2020.01)

(58) Field of Classification Search
CPC .. G06F 17/218; G06F 16/958; G06F 17/2247; G06F 17/227
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

*Primary Examiner* — Stephen S Hong
*Assistant Examiner* — Hope C Sheffield
(74) *Attorney, Agent, or Firm* — Jaffery Watson Mendonsa & Hamilton LLP

(57) ABSTRACT

Embodiments include methods and systems of site migration. In one embodiment, a site migrator receives a website address from a user for a website to be migrated to a content management system (CMS). The site migrator accesses source code of the website at the received website address. The site migrator identifies markup content of the website based on source code of the website. The markup content includes tags grouping content of the website. The site migrator transforms the identified markup content into content modules in a format usable by the CMS based on the tags grouping the content of the website. The site migrator stores the content modules to a memory, sends the content modules to the CMS via an application programming interface (API) to generate a second website which resembles the website to be migrated based on the content modules.

20 Claims, 8 Drawing Sheets

(56) References Cited

U.S. PATENT DOCUMENTS

| | | | |
|---|---|---|---|
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,620,655 B2 | 11/2009 | Larsson et al. | |
| 7,917,507 B2 * | 3/2011 | Kim et al. | 707/736 |
| 8,280,865 B1 * | 10/2012 | Edelman et al. | 707/695 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2002/0194194 A1 * | 12/2002 | Fenton | G06F 17/3089 |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0115365 A1 * | 6/2003 | Lindsey | G06F 17/3061 709/246 |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0010753 A1 * | 1/2004 | Salter et al. | 715/513 |
| 2004/0015981 A1 | 1/2004 | Coker et al. | |
| 2004/0027388 A1 | 2/2004 | Berg et al. | |
| 2004/0070600 A1 * | 4/2004 | Morrisroe et al. | 345/738 |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0282771 A1 * | 12/2006 | Vinci | 715/530 |
| 2007/0208751 A1 * | 9/2007 | Cowan | G06Q 10/10 |
| 2008/0072164 A1 * | 3/2008 | Park | 715/762 |
| 2009/0177959 A1 * | 7/2009 | Chakrabarti | G06F 17/2229 715/234 |
| 2010/0037150 A1 * | 2/2010 | Sawant | G06F 17/30896 715/753 |

\* cited by examiner

METHOD AND SYSTEM FOR SITE MIGRATION

CLAIM OF PRIORITY

This application claims the benefit of U.S. Provisional Patent Application 61/702,051 entitled Site Migration, by Gavin Guinane, filed Sep. 17, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the invention relate generally to computing, and in particular to migration of existing websites to content management systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A user wishing to develop a website using conventional means may develop the website using, for example, an application installed on the user's machine. Alternatively, the user might hire a website designer, who might use an application installed on the website designer's machine. Maintenance and hosting of the website might be performed by a third party, for example, a company specializing in website hosting and domain registration. A user employing such conventional means of developing, maintaining, and hosting a website may be unable to easily update the content of the website, add features to the website, or scale the website without specialized training or relying on the website designer to update the content.

Some website hosting entities may provide applications to enable users to develop basic webpages, however such applications are limited in the features they provide. Furthermore, if a user has an existing website, migrating the existing website over to a hosting entity may require specialized training and considerable manual copying of content to the new host.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Figure 1:
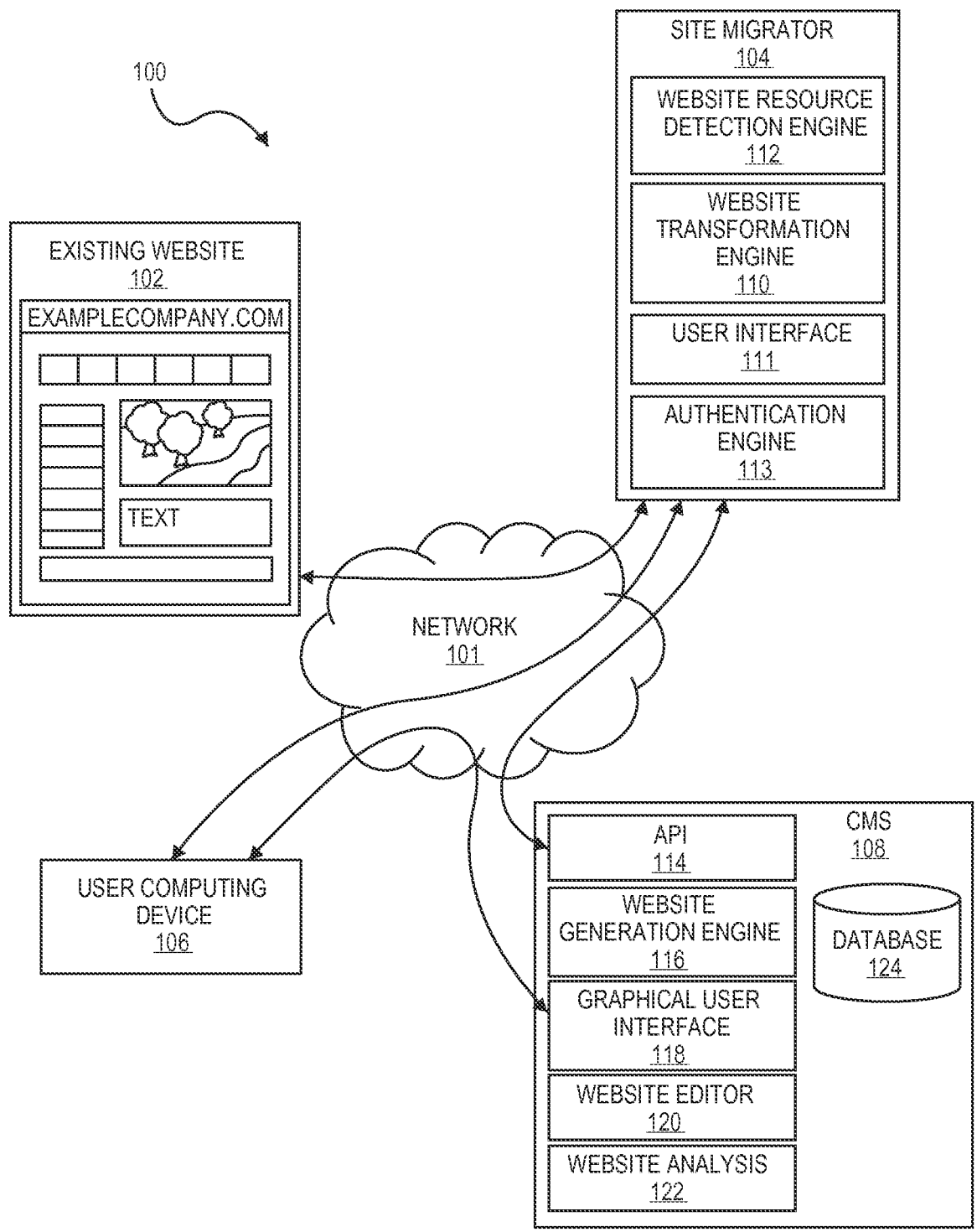
FIG. 1 illustrates a representative architecture for site migration according to an embodiment.

Systems and methods are provided for site migration. According to an embodiment, a user provides a website address for an existing website to a site migration tool, which automatically migrates the website to a Content Management System (CMS) with minimal user involvement. A CMS is a system for hosting, publishing, and/or which enables editing and management of content via a user interface. A CMS can include application(s), service(s) database(s), and other resources for managing content. Some or all aspects of the CMS may be cloud-based. An interface for editing and managing content may include a user interface accessible via a network (e.g., the Internet). The user interface may be a graphical user interface (GUI) enabling a user to easily edit and manage a website by "dragging and dropping" content and features into desired parts of the website. An example of a CMS is "Site.com" (a product of Salesforce.com, Inc.), which provides features such as a "drag-and-drop" interface for creating webpages and importing assets, templates, navigation, style sheets, social media streams, chat, and other social media features, website analysis tools and scaling tools. Other CMS's may provide additional or different features than those described above.

The site migration tool can access the existing website at the provided website address, and identify the resources or assets of the website. Resources can include: markup files (e.g., HTML, XML, and other markup language files), script files (e.g., JavaScript, VBScript, and other script files), graphics, style sheet files (e.g., cascading style sheets (CSS) and other style sheet files), videos, text content (e.g., company or product descriptions, news stories, and any other text content), downloadable content (e.g., portable document format (PDF) files, zip or other archive files, executables, and any other content available for download on the website), and any other content or assets which make up the website, are accessible via the website, or are otherwise referenced by the website.

The site migration tool, in one embodiment, migrates the identified resources to the CMS by transforming some resources into a format for the CMS prior to transmission to the CMS via an Application Program Interface (API). The site migration tool may send other resources without modification to the CMS via the API. Transforming some resources into a format for the CMS can include generating content modules (i.e., groupings of content in a format for the CMS) based on <div> tags in the HTML code of the website, or other tags grouping content of the website. Transforming resources into a format for the CMS can also include identifying static resources of the existing website and transforming the static resources into dynamic resources which can be easily edited and managed via a user interface of the CMS. The CMS stores the received resources in a database for access, editing, and other management activities by the user. The migration process results in a new website hosted by the CMS that resembles the existing website, but which may include new dynamic features. Thus, the user can take advantage of advanced features of the CMS without needing to manually copy over content, and without specialized technical knowledge.

The following detailed description will describe an architecture, system, and method for site migration in accordance with aspects and embodiments of the present invention.

Figure 2:
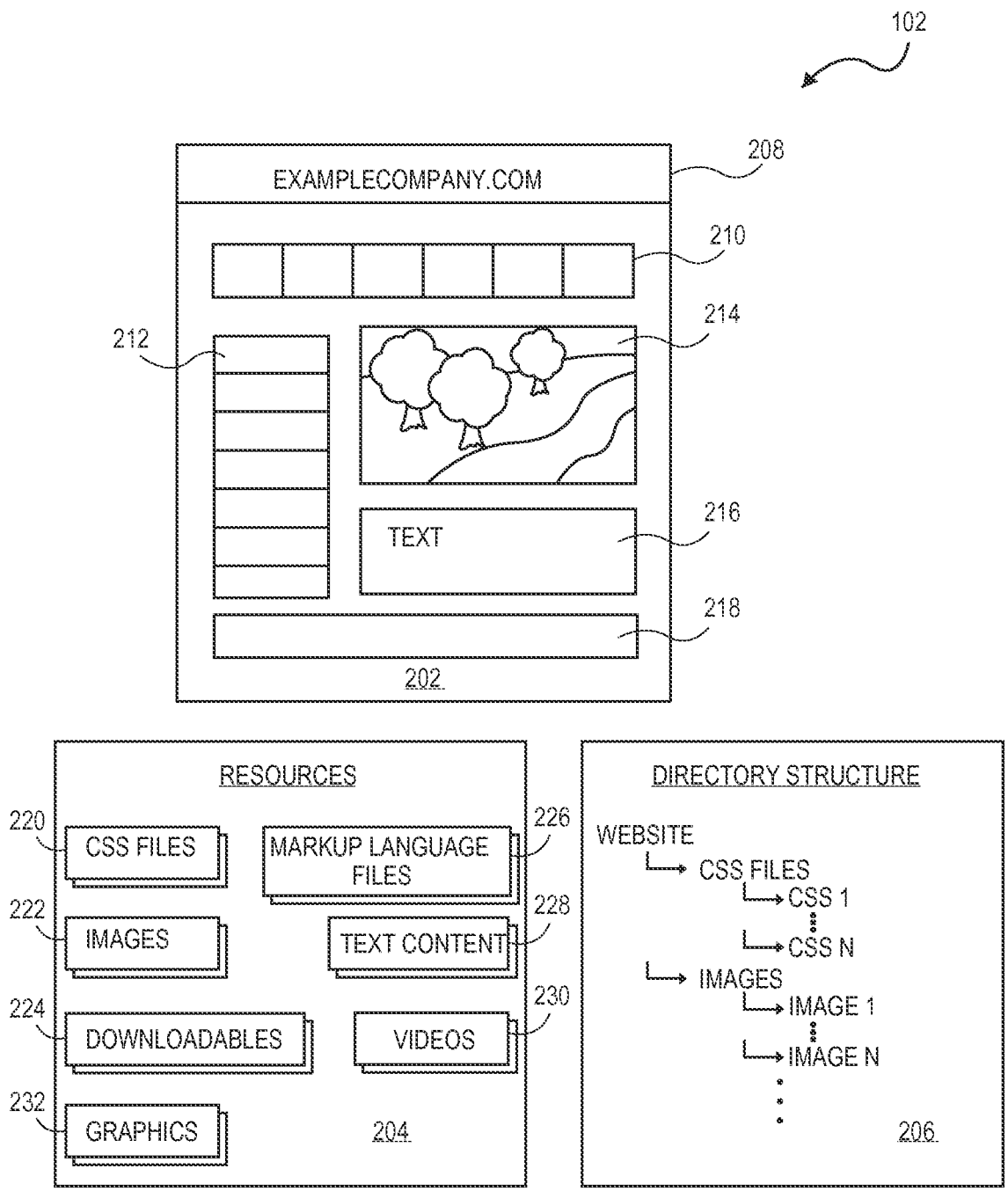
FIG. 2 illustrates a block diagram of an exemplary website to be migrated according to an embodiment.

FIG. 1 illustrates a representative architecture for site migration according to an embodiment. As mentioned briefly above, site migration can be useful when a user has an existing website which the user wishes to migrate to a CMS. For example, FIG. 1 illustrates an existing website 102 to be migrated to a CMS 108. An exemplary user website to be migrated to the CMS 108 is illustrated in greater detail in FIG. 2. FIG. 2 includes a graphical representation 202 of the exemplary website 102 as viewed by a user via a browser (e.g., a web browser application executing on a user computing device 106). The graphical representation 202 illustrates a header 208, a footer 218, menus 210 and 212, and main content or body sections 214 and 216. The main content section 214 illustrates an image and the main content section 216 illustrates text, however other static or dynamic content may be included in the existing website 102. The existing website 102 includes resources 204. In the illustrated embodiment, the resources 204 include: CSS files 220, images 222, downloadable files 224, graphics 232, markup language files 226, text content 228, and videos 230. Other embodiments may include additional or different resources not illustrated in FIG. 2, or exclude some or all of the resources 204 illustrated in FIG. 2. The resources 204 of the website to be migrated to the CMS may be stored on a server and organized in directories as illustrated in the directory structure 206.

A user can migrate the existing website 102 to the CMS 108 with a site migrator 104, which is accessed from the user computing device 106. The user computing device 106 can include any suitable computing device, such as the system 600 described below with respect to FIG. 6. The user computing device 106 can access the site migrator 104 via the network 101, such as the Internet. In one embodiment, prior to accessing the site migration services provided by site migrator 104, the user logs into the site migrator 104. Logging into the site migrator 104 can result in the site migrator 104 verifying the user has a license to access the site migrator 104, and can include other authentication steps such as verifying the user's identity, ownership or other rights with respect to the existing website 102, and/or the identity of the user computing device 106. In one embodiment, an authentication engine 113 performs the authentication. Other embodiments may not include an authentication step prior to providing some or all services of the site migrator 104. For example, in one embodiment, the site migrator 104 performs an analysis of the existing website 102 to determine how successful migration of the existing website 102 to the CMS 108 would be without requiring a license or other authentication.

Figure 4:
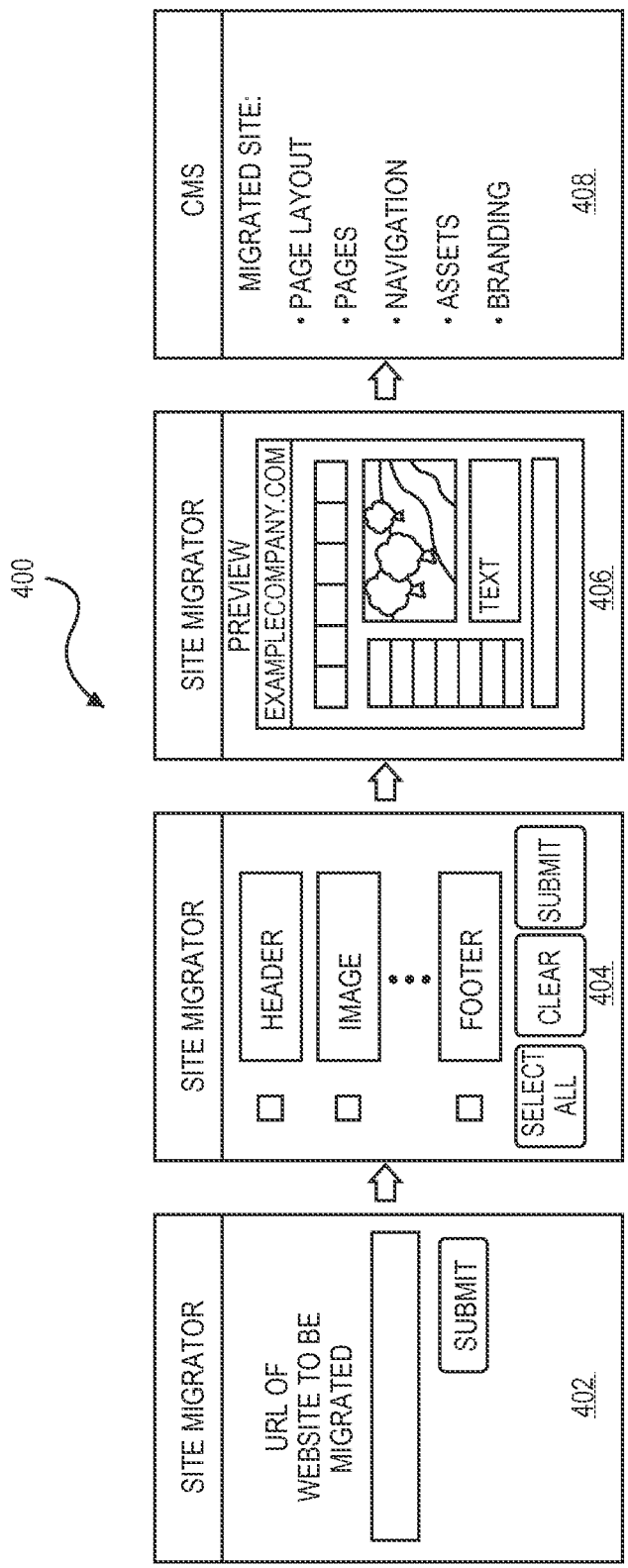
FIG. 4 is a pictorial flow diagram illustrating a high level overview of a technique for site migration in an embodiment.

A user can request that the site migrator 104 migrate the existing website 102 to the CMS 108. A method of site migration, according to an embodiment, is described with respect to FIG. 4. FIG. 4 is a pictorial flow diagram 400 illustrating a high level overview of a technique for site migration in an embodiment. To perform site migration services, the site migrator 104 receives information from the user, such as, for example, the website address of the existing website 102. For example, the user interface 111 of the site migrator 104 provides a mechanism for the user to enter the website address of the existing website 102 and any other information for performing the site migration. A mechanism for entering the website address can include an HTML form or other mechanism for receiving information from a user. An example of such a mechanism is illustrated in the webpage 402 of FIG. 4. The webpage 402 depicts a site migrator web interface prompting a user for the URL of the website to be migrated.

After receiving the website address, in one embodiment, the site migrator 104 verifies the website exists at the website address. If the existing website 102 exists, the site migrator 104 accesses the existing website 102 via the network 101 and identifies the resources 204 of the existing website 102. For example, the website resource detection engine 112 identifies markup content (e.g., markup language files 226 of FIG. 2) of the existing website 102. The site migrator 104 may perform other verification at this point. In one embodiment, the site migrator 104 verifies that the existing website 102 has well-formed HTML which can be automatically migrated to the CMS 108 with minimum errors or user intervention. For example, the site migrator 104 can verify that markup content at the website address includes tags that group content of the website. In one such embodiment, a website transformation engine 110 uses such tags to transform the markup content into content modules which are in a format usable by the CMS 108. The CMS 108 can use the content modules to generate a website "template" or structure into which resources of the existing website 102 are organized. In one embodiment, transforming the identified markup into content modules includes transforming HTML code with an Extensible Style sheet Language Transformations (XSLT) transformer into XML content modules in a format usable by the CMS 108 based on <div> tags in the HTML code of the existing website 102. For example, in one embodiment, the website transformation engine 110 parses identified markup content of the existing website 102, and generates an XML-based content module for each section of the website as divided by <div> tags with an XSLT transformer. Other embodiments may include website transformation engines which are not based on the XSLT standard.

Figure 3:
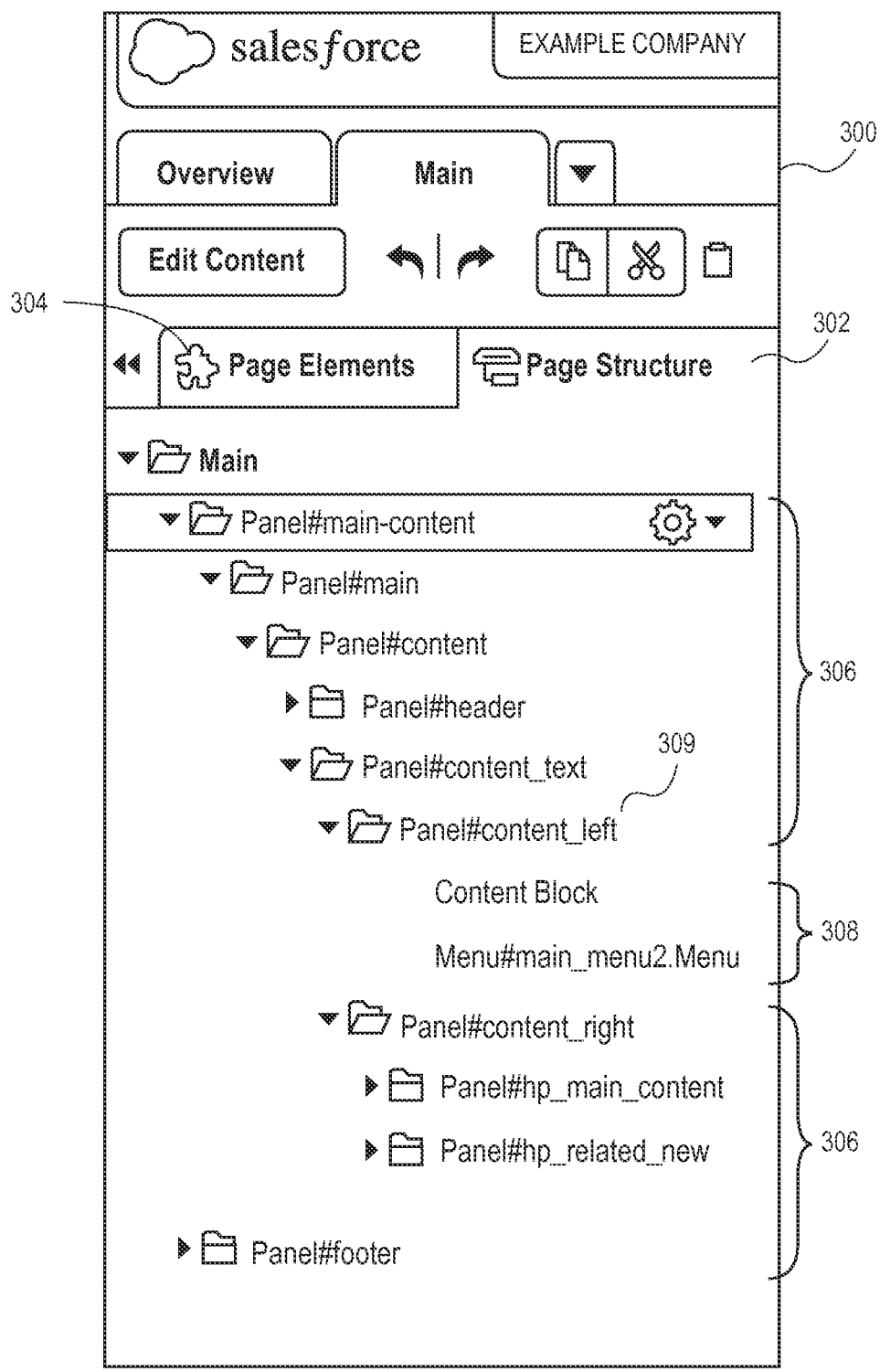
FIG. 3 illustrates an exemplary user interface of a CMS to which a website is migrated according to an embodiment.

The content module also includes other information or metadata. For example, the content module includes a name, which can be the same as the id (name) of the associated <div> tag. Transforming the markup content can also include adding hierarchy information to each content module specifying how each of the content modules interrelate. In another example, transforming the markup content can include adding a content type based on content within the <div> tags and/or the id of the <div> tag. FIG. 3, which is described below in greater detail, includes an example of how markup content transformed into a CMS content module might be organized. FIG. 3 illustrates an exemplary user interface 300 of a CMS to which a website is migrated according to an embodiment. For example, the existing website 102 includes markup content with <div> tags, including a <div> tag with the id of "content_left." The <div> tag "content_left" includes a menu element and some additional content such as text content. The "content_left"<div> tag and the content it encompasses may be transformed into a content module named "content_left" (e.g., content module 309 of FIG. 3). In one embodiment, the website transformation engine 110 recognizes that the "content_left"<div> tag encompasses a menu element, and assigns a content type="menu" to the content module 309. The website transformation engine 110 may include the additional text content (or any other content) within the "content_left"<div> tag in a "Content Block," as displayed in the user interface 300 of FIG. 3. In the example of content module 309 of FIG. 3, the user can select (e.g., by clicking on) the "Content Block" or "Menu#main_menu2.Menu" to view and/or edit the contents. Viewing and/or editing the contents can include editing source code and/or a graphical user interface providing options for editing. In the example where the website transformation engine 110 recognized and assigned the content type of "menu" to the transformed content module, the CMS may automatically make available menu-related features for that content module when the user accesses the content module via the user interface 300.

In another example, transforming the markup content into content modules can include identifying multiple related sections of the website and generating a single content module based on the related sections. For example, a news article may include multiple components such as the body of the article, a "teaser" (i.e., a short item to provide a preview of the article or meant to generate user interest in the article), and an attribution section. The website resource detection engine 112 can identify these related resources and generate a single "news object" content module for migration to the CMS 108.

The site migrator may also identify static resources of the existing website 102 and transform the static resources into dynamic (e.g., modular) resources, according to embodiments. For example, in one embodiment, transforming the identified markup into content modules includes identifying a static menu within the markup and generating a content module that includes a dynamic menu. For example, if the website resource detection engine 112 identifies static graphics, buttons, and or links configured as a menu such as menus 210 and 212 of FIG. 2, the website transformation engine 110 can generate a modular menu which includes the information from the static menu, but is easily modifiable by the user via the graphical user interface 118 of the CMS 108. According to another example, transforming the markup into content modules can include identifying static text content or an image and generating a content module comprising a dynamic repeater component to have a rotating display with the identified static text content or image and other text content or images. In yet another example, transforming the markup into content modules can include identifying formatting information embedded within HTML code, generating a style sheet file based on the identified formatting information, and generating a content module that includes the HTML code and referring to the generated style sheet file.

Although the examples described above refer to <div> tags, other markup tags (elements) may be used in generating the content modules for the CMS 108. For example, embodiments may generate the content modules based on one or more markup tags such as the HTML tags <span>, <li>, <dl>, <ol>, <ul>, <hn> (indicating heading tags with levels 1-n), <p>, <dt>, <dd>, <frame>, <table>, and any other markup tags which group or otherwise separate content.

Returning to FIG. 4, in one embodiment, after the user enters the URL of the website to be migrated via the webpage 402 and the site migrator 104 identifies resources of the existing website 102, the site migrator 104 prompts the user to select which resources to migrate to the CMS 108. Prompting the user to select which resources to migrate to the CMS 108 may occur before or after transformation of the resources into a format usable by the CMS. In one embodiment, prompting the user to select which resources to migrate involves the site migrator 104 sending a list of identified resources of the website to the user, as illustrated by the webpage 404. The list may include text and/or visual representations of the resources. In one embodiment, the identified resources include one or more of markup content, images, style sheet files, and JavaScript files. The user can select one or more of the listed resources for migrating to the CMS 108, and submit the selection to the site migrator 104. The site migrator 104, upon receiving the user's selection from the list, determines the content modules corresponding to the selection from the list to send to the CMS 108. The site migrator 104 then generates and sends to the user a preview of what the migrated website would look like based on the content modules that were determined to correspond to the selection from the list. The website preview is illustrated by webpage 406. The user has the option to confirm the selection of resources or modify the selection of resources.

Once the user confirms the selection of resources, the site migrator 104 sends the content modules and any other resources determined to correspond to the user's selection to the CMS 108. For example, the site migrator 104 sends the generated content modules to an API 114 of the target CMS 108 via the network 101. The site migrator 104 may also send other resources of the existing website 102 without transformation. For example, the website resource detection engine 112 may identify one or more of: images, style sheet files, and JavaScript files of the website based on the source code of the website, and send those identified resources to the CMS 108 via the API 114 without modification.

The CMS 108 stores the received content modules in a database 124. When the migrated website is accessed, the CMS 108 is to retrieve the content modules from the database 124 and a website generation engine 116 generates code to be rendered by a browser based on the content modules. The CMS 108 sends the generated code to a user when the user accesses the migrated website (e.g., via the user computing device 106). The user can then manage and edit the migrated website via the CMS 108, as illustrated by webpage 408. In one embodiment, the CMS provides a graphical user interface 118 and website editor 120 for editing and managing the website. In one embodiment, the graphical user interface 118 and website editor 120 include a view which displays and permits editing of the content modules. For example, as mentioned above, FIG. 3 illustrates an exemplary user interface 300 of a CMS to which a website is migrated according to an embodiment. The user interface 300 includes a page elements tab 304 and a page structure tab 302. The user interface 300 may include other or different tabs than shown in FIG. 3. In the example illustrated in FIG. 3, the page elements tab 304 includes elements which make up the website including the content modules and any other assets (e.g., images, data elements, content blocks, etc.). The page structure tab 302 illustrates the organization of the structure as broken down into the content modules 306. In the illustrated example, the content modules are referred to as "panels." Other resources may fall within a content module, such as the resources 308. In the example illustrated in the user interface 300, the resources 308 include a content block and a menu, however any resources could fall under different content modules in the hierarchy.

The website editor 120, in one embodiment, provides the user with the ability to add complex features via the graphical user interface 118. Such features may include forms, search capabilities, authentication features (e.g., user accounts requiring login) shopping carts and other e-commerce features, news tickers, rotating images or text content, dynamic menus, wiki or forum features, email or chat, interfaces with social networks, or any other website feature.

The CMS 108 may also include a website analysis tool 122 which may collect data related to the website (e.g., number of accesses to the website, duration of visits, most often and least used features) and provide statistics related to the website. The website analysis tool 122 may also provide suggestions to the user regarding features to add to increase traffic based on collected data. Thus, the CMS 108 provides a rich environment for managing a website, and the site migrator 104 can increase the ease at which the existing website 102 is migrated to the CMS 108.

Figure 5:
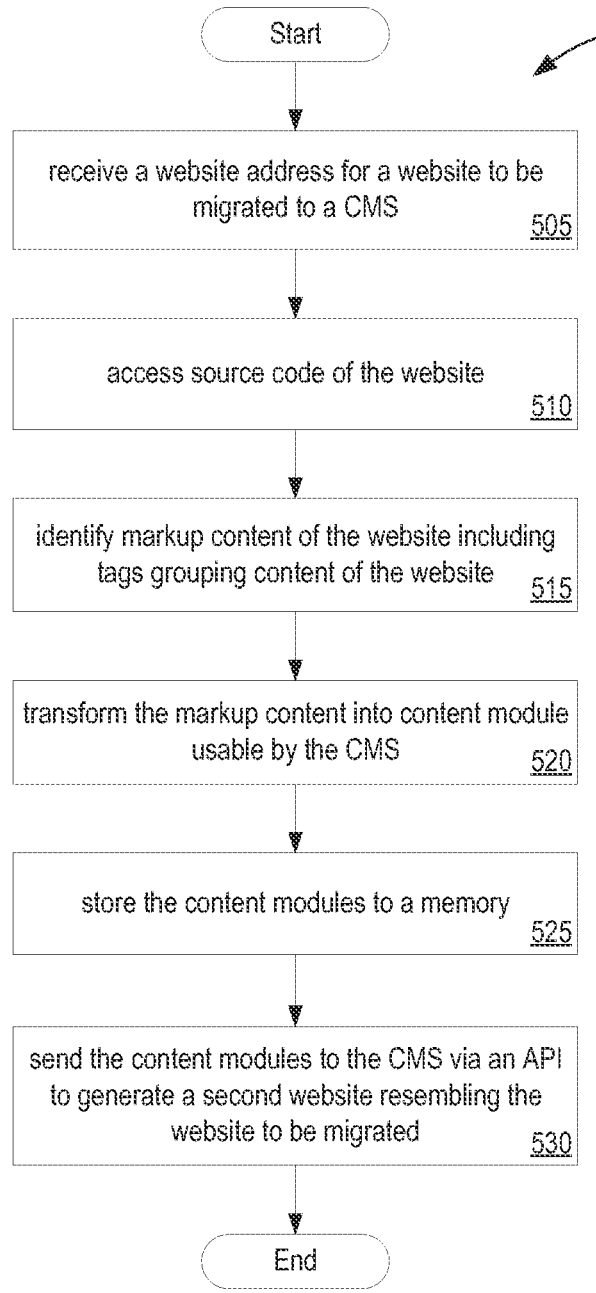
FIG. 5 is an operational flow diagram illustrating a high level overview of a technique for site migration in an embodiment.

FIG. 5 is an operational flow diagram illustrating a high level overview of a technique for site migration in an embodiment. As shown in FIG. 5, at block 505, a site migrator (e.g., the site migrator 104 of FIG. 1) receives a website address from a user for a website to be migrated to a CMS (e.g., the CMS 108 of FIG. 1). For example and without limitation, this can include a uniform resource identifier (URI) (e.g., a uniform resource locator (URL)), an internet protocol address (IP) address, a directory path to a storage device (local or remote), or any other mechanism for identifying a location of a website to be migrated. At block 510, the site migrator further accesses source code of the website at the website address. At block 515, the site migrator identifies markup content of the website based on source code of the website including tags grouping content of the website. At block 520, the site migrator further transforms the identified markup content into content modules in a format usable by the CMS based on the tags grouping the content of the website. At block 525, the site migrator further stores the content modules to a memory, and at block 530, sends the content modules to the CMS via an application programming interface (API) to generate a second website which resembles the website to be migrated based on the content modules.

Figure 6:
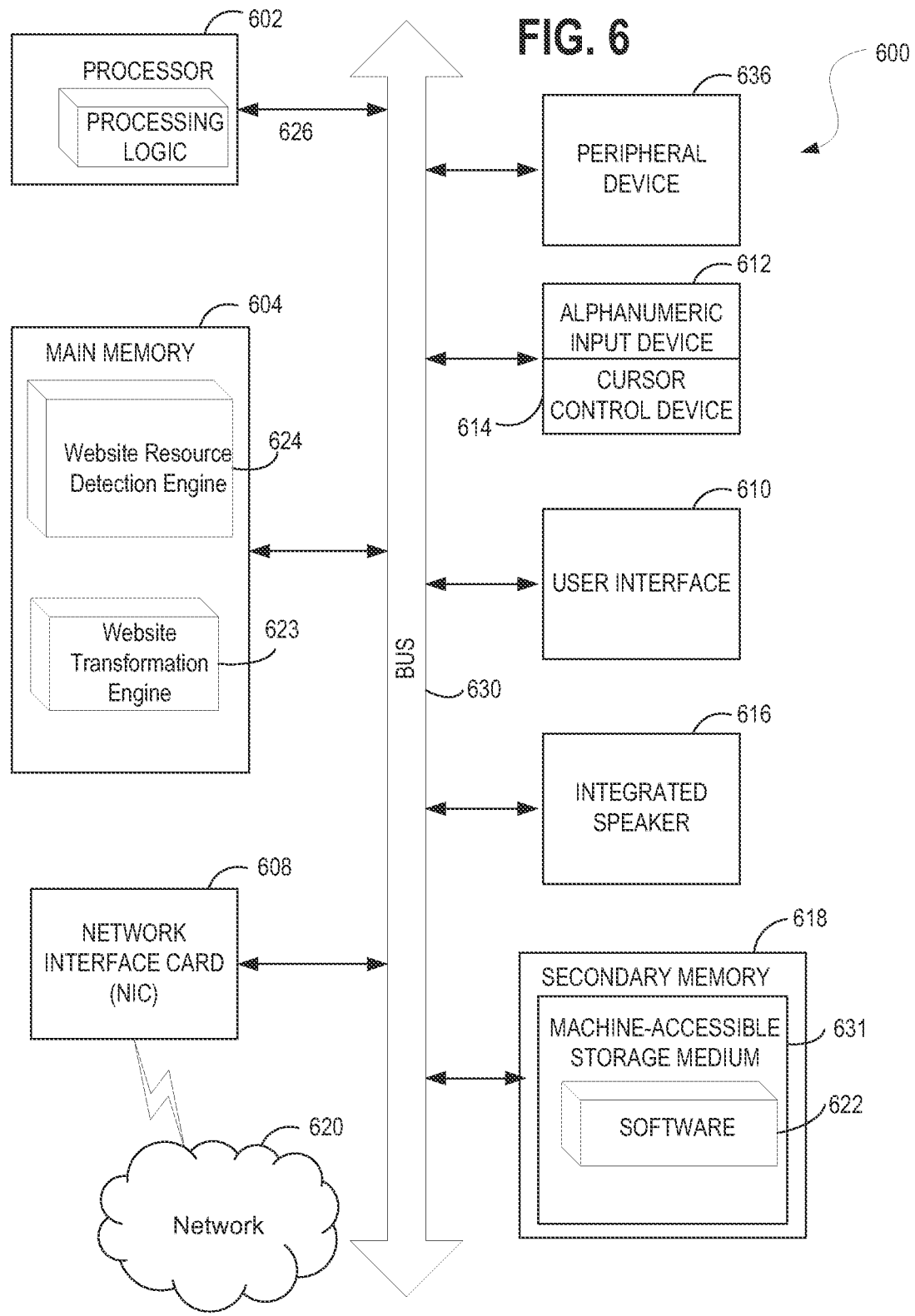
FIG. 6 illustrates a system, in accordance with one embodiment, within which a set of instructions, for causing the system to perform any one or more of the methodologies discussed herein, may be executed.

FIG. 6 illustrates a diagrammatic representation of a machine 600 in the exemplary form of a computer system, in accordance with one embodiment, within which a set of instructions, for causing the machine/computer system 600 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives and a persistent database and/or a multi-tenant database implementation), which communicate with each other via a bus 630. Main memory 604 includes a Website Resource Detection Engine 624 and a Website Transformation Engine 623. Main memory 604 and its sub-elements are operable in conjunction with processing logic 626 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include a network interface card 608. The computer system 600 also may include a user interface 610 (such as a video display unit, a liquid crystal display (LCD), or a cathode ray tube (CRT)), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.).

The secondary memory 618 may include a non-transitory machine-readable or computer readable storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-readable storage media. The software 622 may further be transmitted or received over a network 620 via the network interface card 608.

Figure 7:
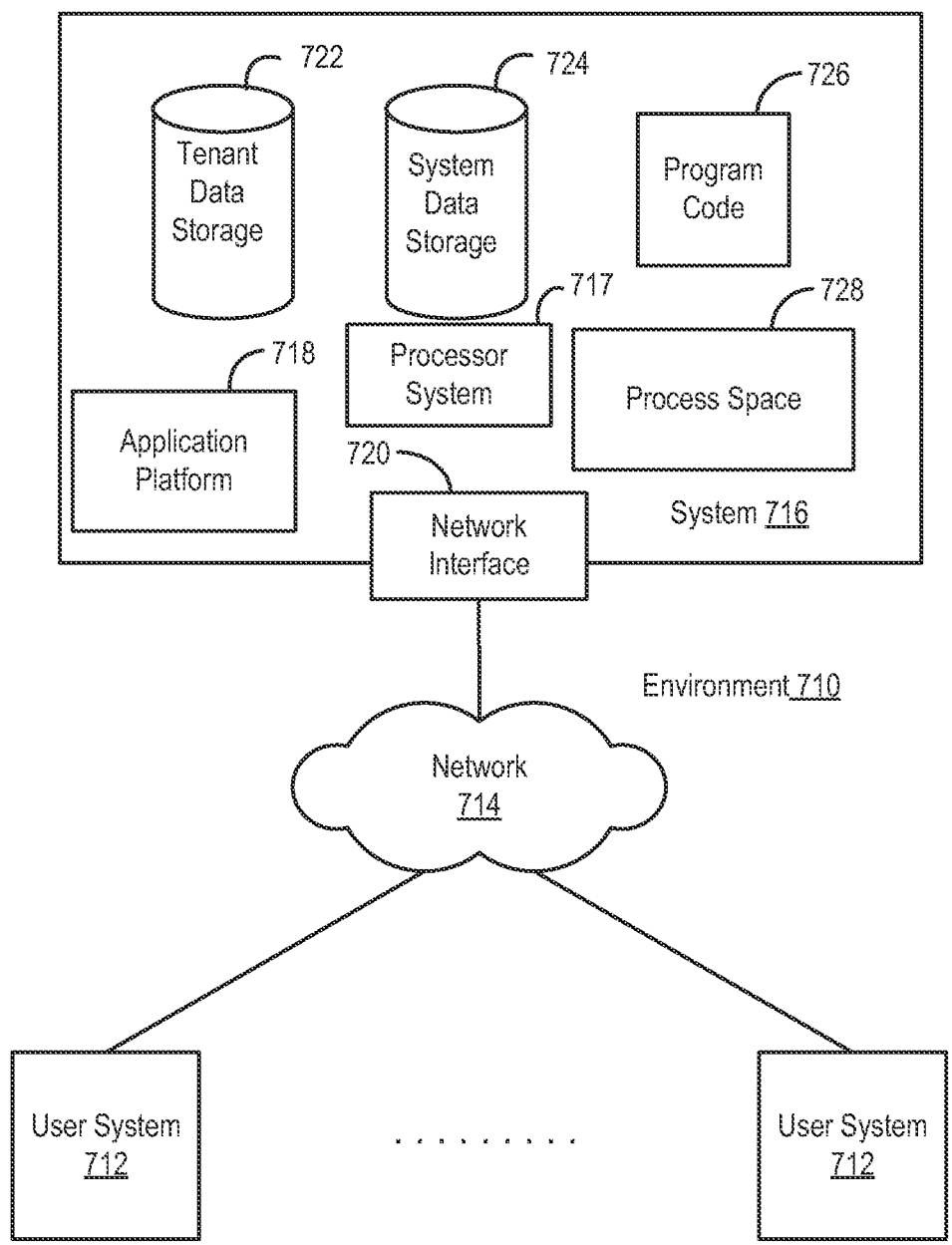
FIG. 7 illustrates a block diagram of an example of an environment wherein an on-demand database service might be used.

FIG. 7 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

Figure 8:
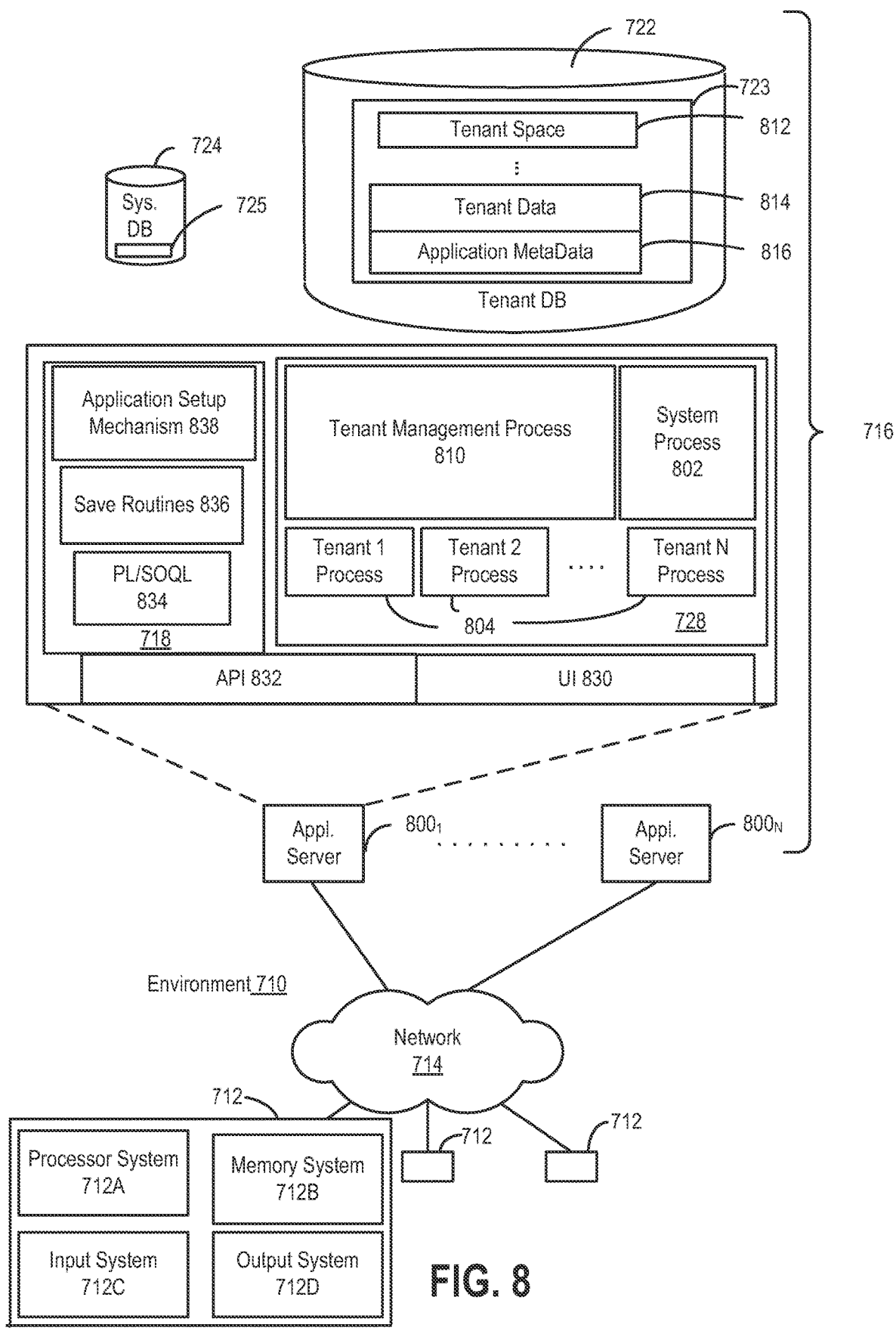
FIG. 8 illustrates a block diagram of an embodiment of elements of FIG. 7 and various possible interconnections between these elements.

One arrangement for elements of system 716 is shown in FIGS. 7 and 8, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers $800_1$-$800_N$, system process space 802, tenant process spaces 804, tenant management process space 810, tenant space 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above with respect to FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant space 812, which can be either a physical arrangement and/or a logical arrangement of data. Within each tenant space 812, tenant data 814 and application metadata 816 might be similarly allocated for each user. For example, a copy of a user's most recently used (MRU) items might be stored to tenant data 814. Similarly, a copy of MRU items for an entire organization that is a tenant might be stored to tenant space 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, user system 716 is multi-tenant, wherein user system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Thus embodiments include systems and methods of site migration. Embodiments can enable easy migration of existing sites to a CMS, which may improve work flow and ease of use of management of the website due to the CMS being cloud-based, high-performance, highly available, and scalable. In addition to migrating the existing website to the CMS, the site migrator can replace static HTML elements with dynamic components available via the CMS.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
receiving a website address, at a server computing device having at least one processor coupled with a memory, for a first website to be migrated to a content management system (CMS);
identifying, with the server computing device, markup content of the first website based on source code of the first website, the markup content comprising tags grouping content of the first website;
performing an analysis of the first website to determine how successful migration of the first website to the CMS would be without requiring a license or other authentication prior to a user login;
performing an authentication with respect to the first website in response to the user login;
transforming, with the server computing device, the identified markup content into content modules that are in a format usable by the CMS to generate a website template for a second website by using the tags in the identified markup content of the first website to transform code of a first type into content modules of a second type in a format usable by the CMS and generating the content modules for each section of the website as divided by the tags;
organizing resources of the first website according to the template generated for the second website, wherein organizing comprises at least transforming the markup content to include hierarchy information to each content module specifying how each of the content modules interrelate and adding at least one dynamic CMS feature to the second website that was not part of the first website;
storing the organized content modules to the memory;
transforming, with the server computing device, at least one static menu from the organized resources of the first website to a corresponding dynamic menu in the second website; and
sending the organized content modules to the CMS via an application programming interface (API) and sending unmodified resources from the first website via the API to generate the second website based on the content modules according to the authentication, where the second website substantially resembles the first website augmented with the at least one dynamic CMS feature that was not part of the first website and the dynamic menu corresponding to the static menu of the first website.

2. The method of claim 1, further comprising:
identifying one or more of: images, style sheet files, and JavaScript files of the website based on the source code of the website; and
sending the identified images, style sheet files, and/or JavaScript files to the CMS via the API.

3. The method of claim 1, further comprising:
verifying the website exists at the website address; and
verifying the markup content at the website address includes the tags grouping content of the website to enable transforming the markup content into the content modules in the format usable by the CMS.

4. The method of claim 2, further comprising:
sending a list of identified resources of the website to the user, the identified resources comprising one or more of the identified markup content, images, style sheet files, and JavaScript files;
receiving, from the user, a selection from the list to migrate to the CMS;
determining the content modules corresponding to the selection from the list to send to the CMS;
sending, to the user, a preview of the second website based on the content modules determined to correspond to the selection from the list;
receiving a confirmation from the user related to the preview of the second website.

5. The method of claim 1, wherein:
the content modules are in a format to be displayable and editable by the user via a graphical user interface of the CMS;
the CMS is to store the content modules to a database; and
the CMS is to retrieve the content modules from the database, generate code to be rendered by a web browser based on the content modules, and send the generated code to the user when the user accesses the second website.

6. The method of claim 1, wherein transforming the identified markup into content modules comprises transforming HTML code with an XSLT transformer into XML content modules in the format usable by the CMS based on <div> tags in the HTML code.

7. The method of claim 6, wherein transforming the HTML code with an XSLT transformer into XML content modules in the format usable by the CMS comprises adding hierarchy information specifying how each of the XML content modules interrelate, and adding a content type based on content within the <div> tags.

8. The method of claim 1, wherein transforming the identified markup into content modules comprises identifying the static menu within the HTML code and generating a content module comprising the dynamic menu based on the static menu.

9. The method of claim 1, wherein transforming the identified markup into content modules comprises identifying static text content or an image and generating a content module comprising a dynamic repeater component to have a rotating display with the identified static text content or image and other text content or images.

10. The method of claim 1, wherein transforming the identified markup into content modules comprises identifying formatting information embedded within HTML code, generating a style sheet file based on the identified formatting information, and generating a content module comprising the HTML code and referring to the generated style sheet file.

11. A non-transitory machine-readable storage medium storing one or more sequences of instructions which, when executed by one or more processors, are configurable to cause the one or more processors to carry out:
receiving a website address, at a server computing device having at least one processor coupled with a memory, from a user computing device for a first website to be migrated to a content management system (CMS);
identifying, with the server computing device, markup content of the first website based on source code of the first website, the markup content comprising tags grouping content of the first website;
performing an analysis of the first website to determine how successful migration of the first website to the CMS would be without requiring a license or other authentication prior to a user login;
performing an authentication with respect to the first website in response to the user login;
transforming, with the server computing device, the identified markup content into content modules that are in a format usable by the CMS to generate a website template for a second website by using the tags in the identified markup content of the first website to transform code of a first type into content modules of a second type in a format usable by the CMS and generating the content modules for each section of the website as divided by the tags;
organizing resources of the first website according to the template generated for the second website, wherein organizing comprises at least transforming the markup content to include hierarchy information to each content module specifying how each of the content modules interrelate and adding at least one dynamic CMS feature to the second website that was not part of the first website;
storing the organized content modules to the memory; and
transforming, with the server computing device, at least one static menu from the organized resources of the first website to a corresponding dynamic menu in the second website; and
sending the organized content modules to the CMS via an application programming interface (API) and sending unmodified resources from the first website via the API to generate the second website based on the content modules according to the authentication, where the second website substantially resembles the first website augmented with the at least one dynamic CMS feature that was not part of the first website and the dynamic menu corresponding to the static menu of the first website.

12. The machine-readable storage medium of claim 11, wherein the one or more sequences of instructions cause the one or more processors to further carry out:
identifying one or more of: images, style sheet files, and JavaScript files of the website based on the source code of the website; and
sending the identified images, style sheet files, and/or JavaScript files to the CMS via the API.

13. The machine-readable storage medium of claim 11, wherein the one or more sequences of instructions cause the one or more processors to further carry out:
verifying the website exists at the website address; and
verifying the markup content at the website address includes the tags grouping content of the website to enable transforming the markup content into the content modules in the format usable by the CMS.

14. The machine-readable storage medium of claim 12, wherein the one or more sequences of instructions cause the one or more processors to further carry out:
sending a list of identified resources of the website to the user, the identified resources comprising one or more of the identified markup content, images, style sheet files, and JavaScript files;
receiving, from the user, a selection from the list to migrate to the CMS;
determining the content modules corresponding to the selection from the list to send to the CMS;
sending, to the user, a preview of the second website based on the content modules determined to correspond to the selection from the list;
receiving a confirmation from the user related to the preview of the second website.

15. The machine-readable storage medium of claim 11, wherein:
the content modules are in a format to be displayable and editable by the user via a graphical user interface of the CMS;
the CMS is to store the content modules to a database; and
the CMS is to retrieve the content modules from the database, generate code to be rendered by a web browser based on the content modules, and send the generated code to the user when the user accesses the second website.

16. The machine-readable storage medium of claim 11, wherein transforming the identified markup into content modules comprises transforming HTML code with an XSLT transformer into XML content modules in the format usable by the CMS based on <div> tags in the HTML code.

17. The machine-readable storage medium of claim 16, wherein transforming the HTML code with an XSLT transformer into XML content modules in the format usable by the CMS comprises adding hierarchy information specifying how each of the XML content modules interrelate, and adding a content type based on content within the <div> tags.

18. A computing device comprising:
a processor to execute instructions at the computing device;

a communication interface to receive a first website address from a user for a website to be migrated to a content management system (CMS);

a website resource detection engine to:

identify markup content of the first website based on source code of the first website, the markup content comprising tags grouping content of the first website, perform an analysis of the first website to determine how successful migration of the first website to the CMS would be without requiring a license or other authentication prior to a user login, and performing an authentication with respect to the first website in response to the user login;

a website transformation engine to transform the identified markup content into content modules in a format usable by the CMS based on the tags grouping the content of the first website and during the generating of the second website, transforming, with the server computing device, the identified markup content into content modules that are in a format usable by the CMS to generate a website template for a second website by using the tags in the identified markup content of the first website to transform code of a first type into content modules of a second type in a format usable by the CMS and generating the content modules for each section of the website as divided by the tags, wherein organizing comprises at least transforming the markup content to include hierarchy information to each content module specifying how each of the content modules interrelate and adding at least one dynamic CMS feature to the second website that was not part of the first website; and a memory to store the content modules;

wherein the communication interface is to further send the content modules to the CMS via an application programming interface (API) to generate a second website based on the content modules according to the authentication, where the second website substantially resembles the first website and adding at least one dynamic CMS feature to the second website that was not part of the first website augmented with the at least one dynamic CMS feature that was not part of the first website and the dynamic menu corresponding to the static menu of the first website.

19. The computing device of claim 18, wherein:

the website resource detection engine is to further identify one or more of: images, style sheet files, and/or JavaScript files of the website based on the source code of the website; and the communication interface is to further send the identified images, style sheet files, and JavaScript files to the CMS via the API.

20. The computing device of claim 18, wherein:

the website resource detection engine is to further:

verify the website exists at the website address; and verify the markup content at the website address includes the tags grouping content of the website to enable transforming the markup content into the content modules in the format usable by the CMS.

* * * * *